United States Patent
Xiong et al.

(10) Patent No.: US 10,486,304 B2
(45) Date of Patent: Nov. 26, 2019

(54) JOINT STRUCTURE AND ROBOT

(71) Applicant: UBTECH Robotics Corp., Shenzhen (CN)

(72) Inventors: Youjun Xiong, Shenzhen (CN); Qi Zhao, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/607,519

(22) Filed: May 28, 2017

(65) Prior Publication Data

US 2018/0186017 A1  Jul. 5, 2018

(30) Foreign Application Priority Data

Dec. 30, 2016 (CN) .......................... 2016 1 1251396

(51) Int. Cl.
*B25J 9/00* (2006.01)
*B25J 18/04* (2006.01)
*B25J 17/00* (2006.01)

(52) U.S. Cl.
CPC .............. *B25J 9/0009* (2013.01); *B25J 17/00* (2013.01); *B25J 18/04* (2013.01)

(58) Field of Classification Search
CPC .... B25J 17/02; B25J 17/0258; B25J 17/0275; B25J 9/0045; B25J 9/0054; B25J 9/06; B25J 9/009
USPC ................ 901/23, 28, 29; 403/78, 164, 165, 403/335–337, 360; 74/490.01–490.06
See application file for complete search history.

(56) References Cited

U.S. PATENT DOCUMENTS

| | | | | |
|---|---|---|---|---|
| 4,969,795 A | * | 11/1990 | Toyoda | B25J 9/047 414/744.2 |
| 5,231,889 A | * | 8/1993 | Lee | B25J 17/025 74/479.01 |
| 5,732,599 A | * | 3/1998 | Iriyama | B25J 17/0241 74/490.02 |
| 6,084,373 A | * | 7/2000 | Goldenberg | B25J 9/08 318/568.11 |
| 6,415,678 B1 | * | 7/2002 | Nada | B25J 17/0291 74/490.06 |
| 6,795,750 B2 | * | 9/2004 | Kullborg | B25J 17/0283 700/245 |
| 7,878,088 B2 | * | 2/2011 | Tamura | B25J 19/0075 277/353 |
| 7,938,038 B2 | * | 5/2011 | Sugawara | B25J 17/0258 74/490.04 |
| 7,938,631 B2 | * | 5/2011 | Lisi | F04D 29/605 417/360 |
| 9,358,682 B2 | * | 6/2016 | Ruiz Morales | B25J 9/041 |

(Continued)

FOREIGN PATENT DOCUMENTS

JP 03117592 A * 5/1991

*Primary Examiner* — William Kelleher
*Assistant Examiner* — Bobby Rushing, Jr.

(57) ABSTRACT

A joint structure includes a fixed member, a rotatable member and a connection assembly. The fixed member includes a housing and a first servo disposed within the housing. The connection assembly is used to connect the rotatable member to an output shaft of the first servo. The connection assembly includes a first flange fixedly connected to the rotatable member and a second flange connected to the output shaft of the first servo and the first flange, and the rotatable member extend from within the housing to an outside of the housing.

10 Claims, 7 Drawing Sheets

(56) References Cited

U.S. PATENT DOCUMENTS

| | | | |
|---|---|---|---|
| 10,022,876 B2* | 7/2018 | Kinoshita | B25J 15/0009 |
| 2009/0178506 A1* | 7/2009 | Yamamoto | B25J 9/102 |
| | | | 74/490.03 |
| 2011/0113917 A1* | 5/2011 | Long | B25J 9/102 |
| | | | 74/490.03 |
| 2015/0250087 A1* | 9/2015 | Daining | F16D 1/06 |
| | | | 172/28 |
| 2016/0193735 A1* | 7/2016 | Krumbacher | B25J 9/102 |
| | | | 74/490.02 |
| 2016/0221197 A1* | 8/2016 | Claffee | F16H 25/20 |
| 2018/0207795 A1* | 7/2018 | Haddadin | B25J 9/0009 |

* cited by examiner

US 10,486,304 B2

JOINT STRUCTURE AND ROBOT

CROSS REFERENCE TO RELATED APPLICATIONS

This application claims priority to Chinese Patent Application No. 201611251396.2, filed Dec. 30, 2016, which is hereby incorporated by reference herein as if set forth in its entirety.

BACKGROUND

1. Technical Field

The present disclosure generally relates to the field of robotics, and particularly to a joint structure and a robot.

2. Description of Related Art

Typically, robots include plural joint structures for connecting two components and enabling one of the two components to rotate with respect to the other. One problem with some conventional joint structures is that it is not easy for servos to align with other components during installation of the servos. The installation of servos is thus time-consuming, resulting in a low efficiency in the assembly of the joint structures.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
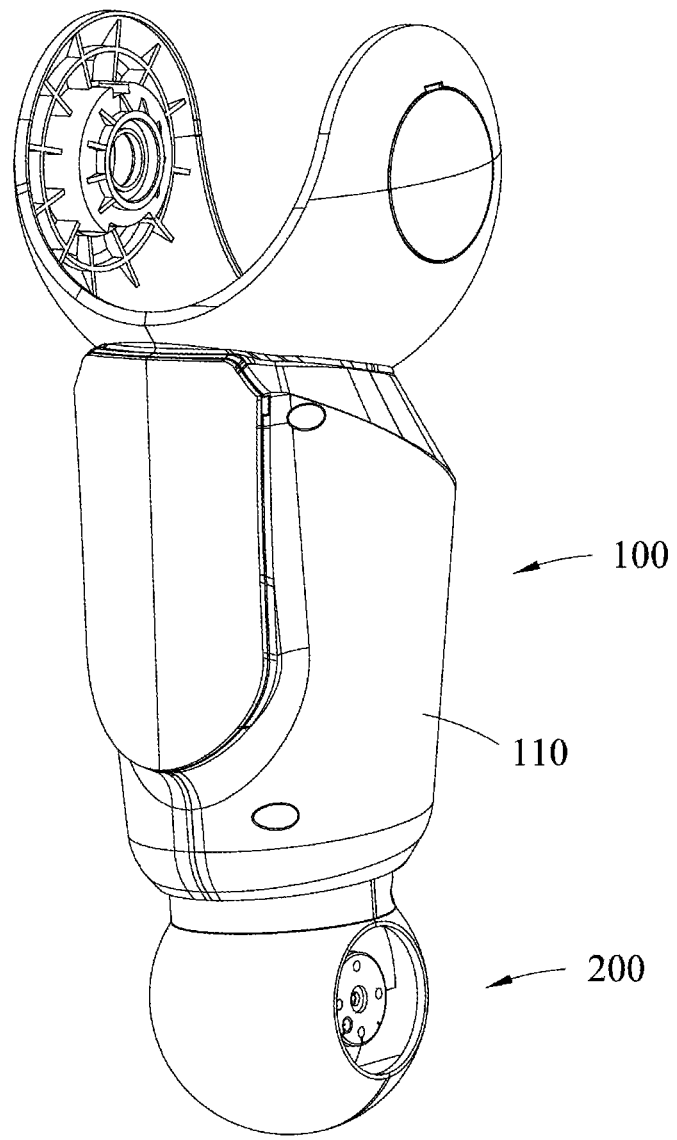
FIG. 1 is an isometric view of a joint structure according to a first embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

The present embodiment provides a joint structure that can be used to connect two adjacent robotic arms or to connect two adjacent robotic fingers. In the present embodiment, as an example, the joint structure is used to connect two adjacent robotic arms.

Figure 2:
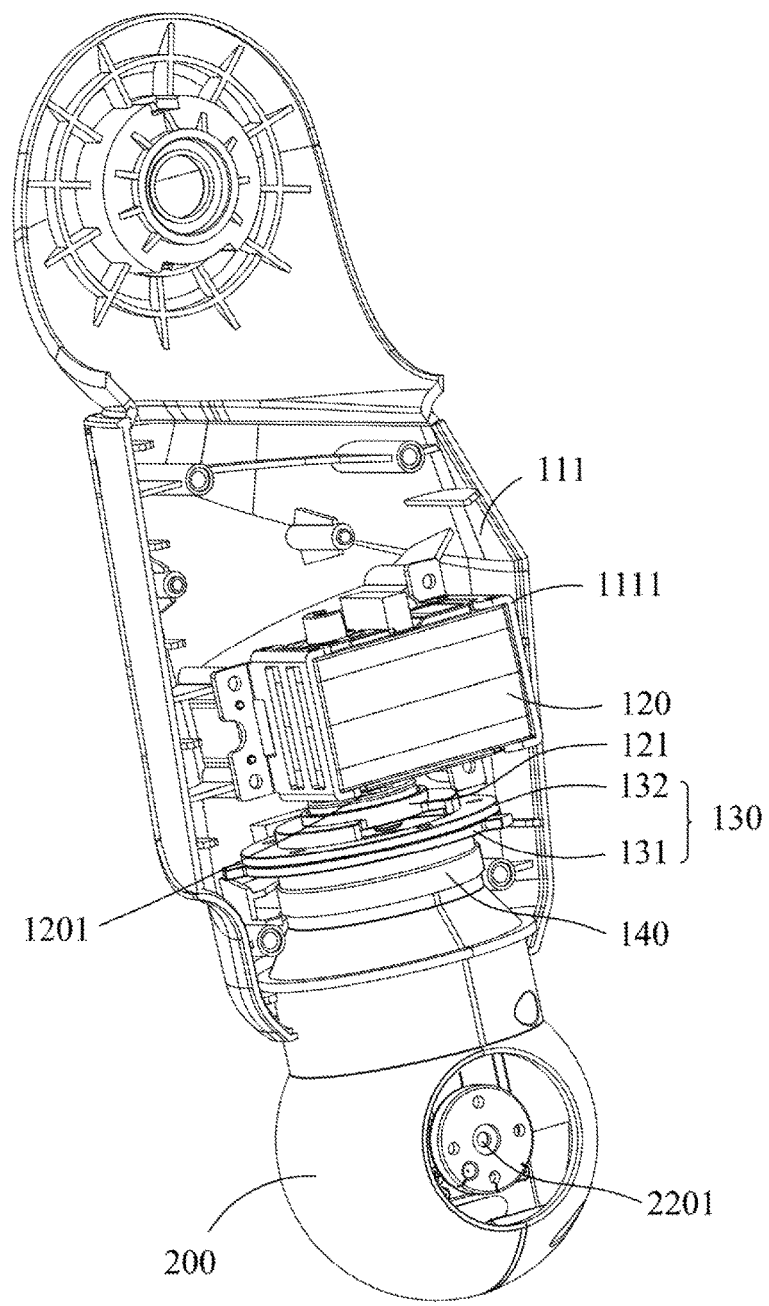
FIG. 2 is an isometric view of the joint structure of FIG. 1 with some components omitted for clarity.
Figure 3:
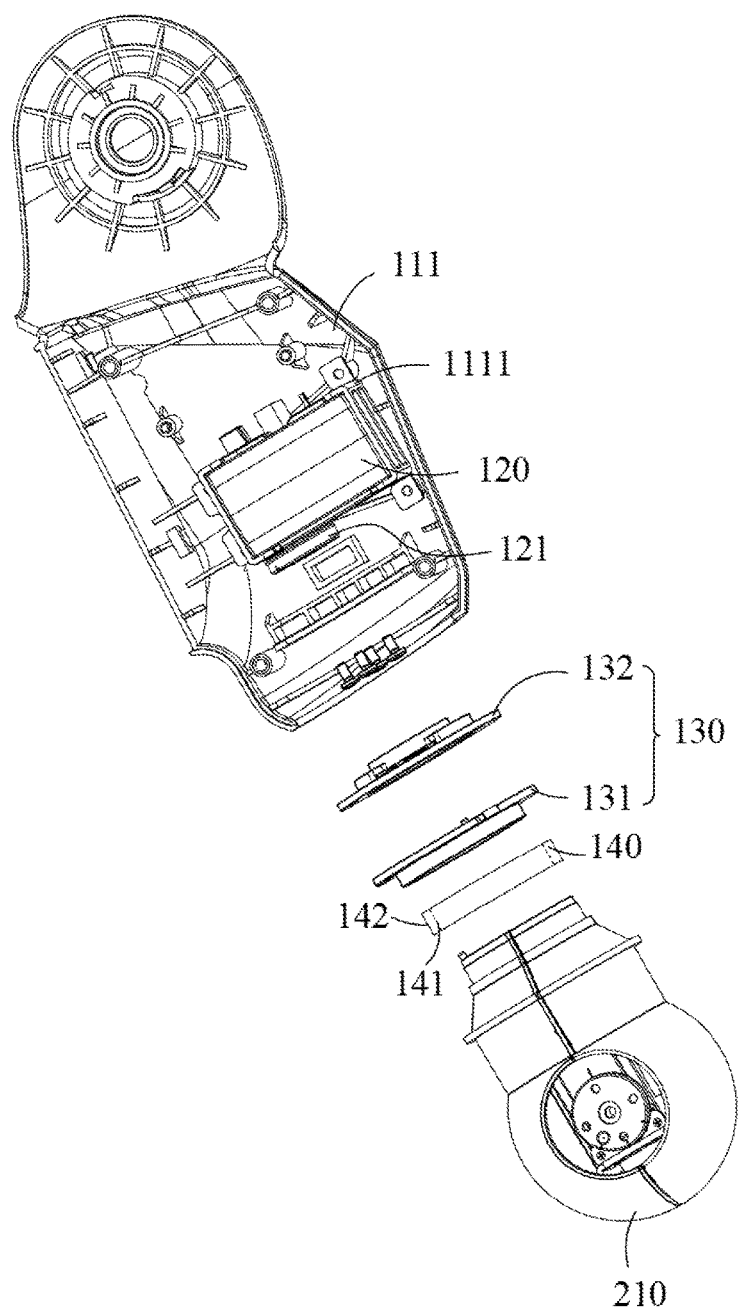
FIG. 3 is an isometric exploded view of the joint structure of FIG. 2.

Referring to FIGS. 1-3, a joint structure includes a fixed member 100, a rotatable member 200 and a connection assembly 130. The fixed member 100 includes a housing 110 and a first servo 120 disposed within the housing 110. The connection assembly 130 is used to connect the rotatable member 200 to an output shaft 1201 of the first servo 120. The first servo 120 is sued to drive the rotatable member 200 to rotate.

Referring to FIGS. 2 and 3, the connection assembly 130 includes a first flange 131 fixedly connected to the rotatable member 200 and a second flange 132 that is connected to the output shaft of the first servo 120. The second flange 132 is also connected to the first flange 131 via screws. The rotatable member 200 extend from within the housing 110 to an outside of the housing 110.

In the joint structure of the present disclosure, the first servo 120 is connected to the rotatable member 200 through the connection assembly 130, or more exactly, through the first flange 131 and the second flange 132. Since the first flange 131 and the second flange 132 are of flat plate, they can be easily and accurately aligned with each other and then be connected together. The first servo 120 can thus be easily and accurately aligned with another component (i.e., the rotatable member 200), thereby reducing the time for installing the servo 120 and increasing the assembling efficiency of the joint structure.

In the embodiment, the first flange 131 and the second flange 132 are connected to each other via screws. During the installation of the first servo 120, first fixing the first flange 131 to the rotatable member 200, and fixing the second flange 132 to the output shaft of the first servo 120. Then causing the side of the second flange 132 opposite of the side with the first servo 120 to contact the side of the first flange 131 opposite of the side with the rotatable member 200. The first flange 131 and the second flange 132 are then moved with respect to each other until they are properly aligned with each other. After that, the first flange 131 and the second flange 132 are ready to be connected to each other via screws. During the movement of the first flange 131 with respect to the second flange 132, it is preferred to first align a thread hole in the first flange 131 with a corresponding threaded hole in the second flange 132, and then turn a screw into the two threaded holes. After that, the first flange 131 and the second flange 132 are fully aligned with each other by turning another screw into another two threaded holes in the first flange 131 and the second flange 132.

The first servo 120 can be detached from the joint structure after the screws for connecting the first flange 131 and the second flange 132 are removed.

In one embodiment, a positioning structure may be provided between the first flange 131 and the second flange 132. Specifically, a positioning groove may be defined in the first flange 131, and the second flange 132 may include a positioning protrusion corresponding to the positioning groove. It is to be understood that the positioning groove may be defined in the second flange 132, and the positioning protrusion that is engaged with the positioning groove may be formed on the first flange 131.

Referring to FIGS. 2 and 3, in the embodiment, the first servo 120 includes a first servo disc 121 connected to its output shaft, and the first servo disc 121 is detachably connected with the second flange 132 via screws. The output shaft of the first servo 120 is thus connected to the second flange 132 via the first servo disc 121. Since the first servo disc 120 is of a flat plate, it is convenient for the first servo disc 121 to align with the second flange 132. Since the first servo disc 121 is connected to the second flange 132 via screws, it is easy for the first servo disc 121 to be attached to or detached from the second flange 132.

Referring to FIGS. 1-4, the housing 110 includes a first housing 111 and a second housing (not labeled) detachably connected to the first housing 111. The first housing 111 and the second housing corporately define a first receiving chamber and a first through hole communicating with the first receiving chamber. The rotatable member 200 passes through the first through hole, and the first servo 120 is received within the first receiving chamber. Since the first housing 111 and the second housing are detachably connected to each other, it facilitates the detaching of the first servo 120 after the first housing 111 and the second housing are detached from each other.

Figure 4:
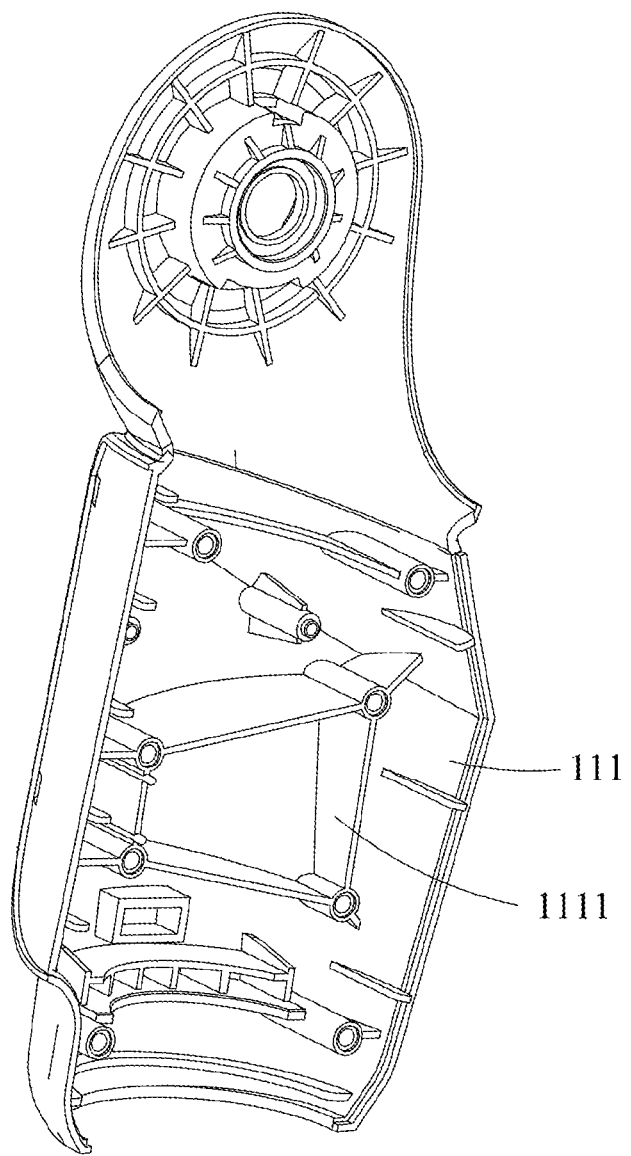
FIG. 4 is an isometric view of a first housing of the joint structure of FIG. 1.

In one embodiment, as shown in FIGS. 2 and 4, the first housing 111 includes a first limiting portion 1111 at an inner side thereof, the second housing includes a second limiting portion at an inner side thereof. The first limiting portion 1111 and the second limiting portion corporately surround the first servo 120, which prevents the first servo 120 from moving in the first receiving chamber.

In the embodiment, the first servo 120 is fixed in the first housing 111 via a metal support (not labeled). It is to be understood that the first servo 120 may be fixed in the second housing via a metal support.

Referring to FIGS. 2 and 3, the fixed member 100 includes a bearing 140. The rotatable member 200 passes through and is in tight interference fit with an inner ring 141 of the bearing 140, and an outer ring 42 of the bearing 140 is in tight interference fit with the inner side of the housing. It can prevent the rotatable member 200 or the housing 110 from being worn due to the rotation of the rotatable member 200 while allowing the rotatable member 200 to rotatable with respect to the housing 110 through the arrangement of the bearing 140.

Embodiment 2

Figure 5:
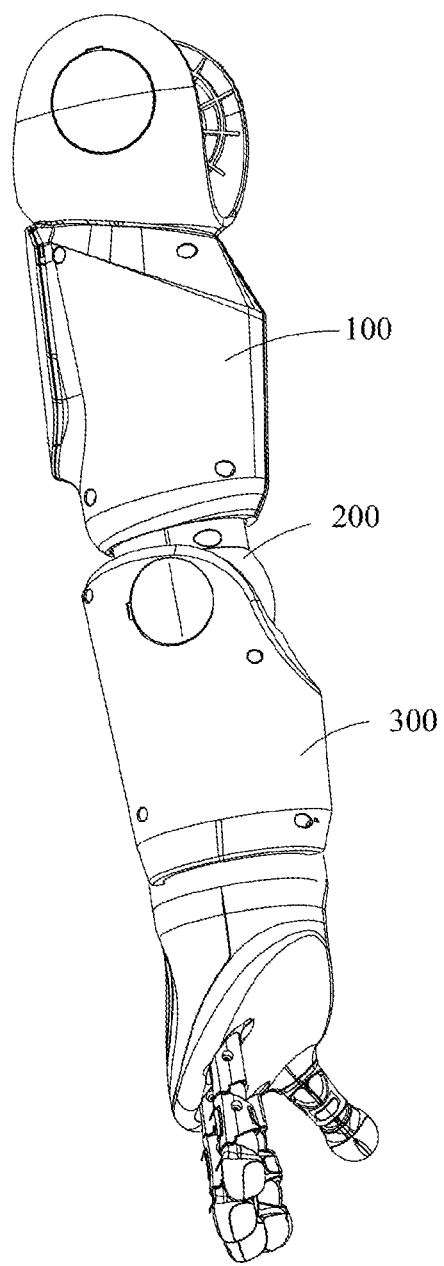
FIG. 5 is an isometric view of a joint structure according to a second embodiment.
Figure 6:
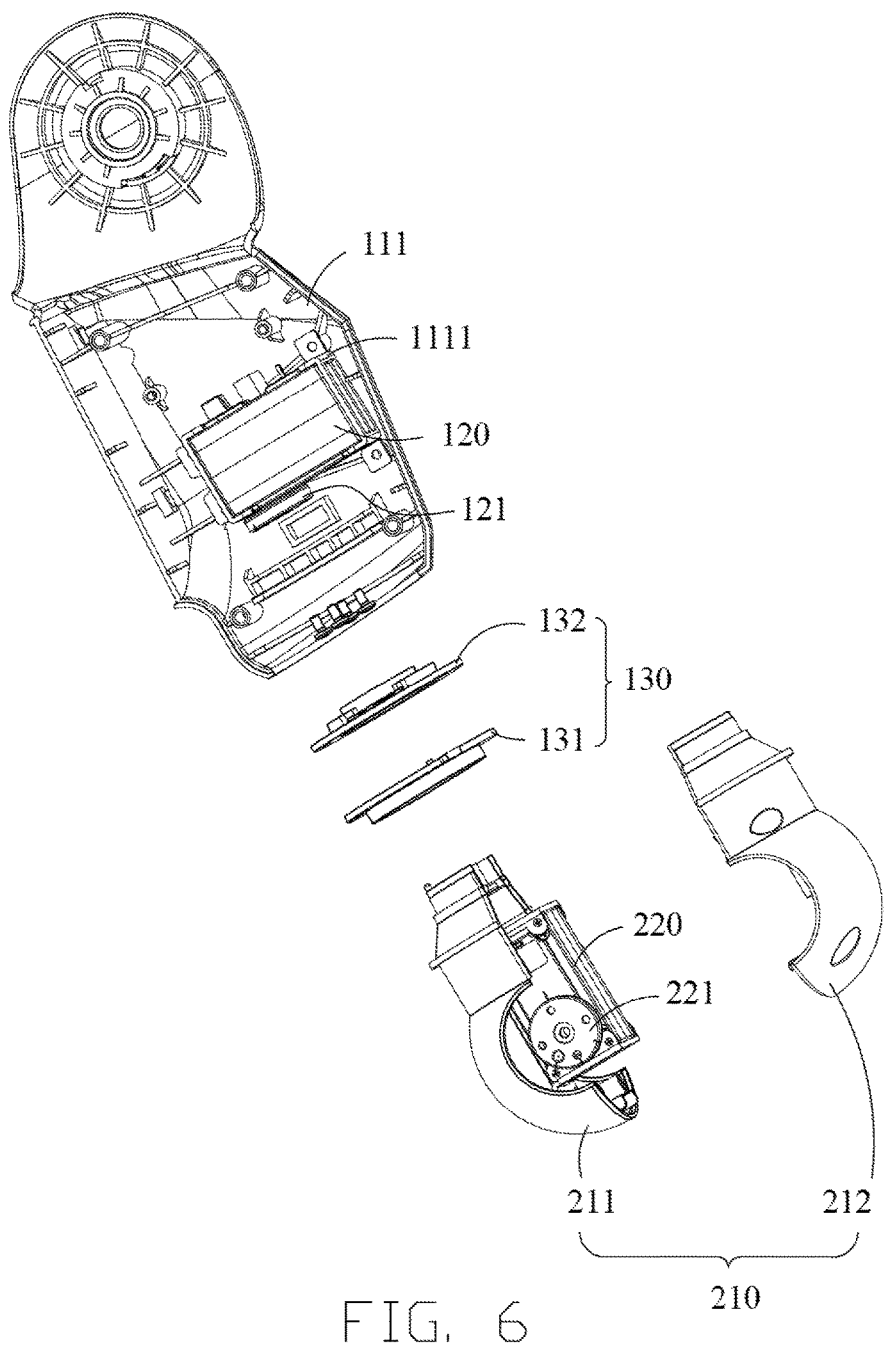
FIG. 6 is an isometric exploded view of the joint structure of FIG. 5.
Figure 7:
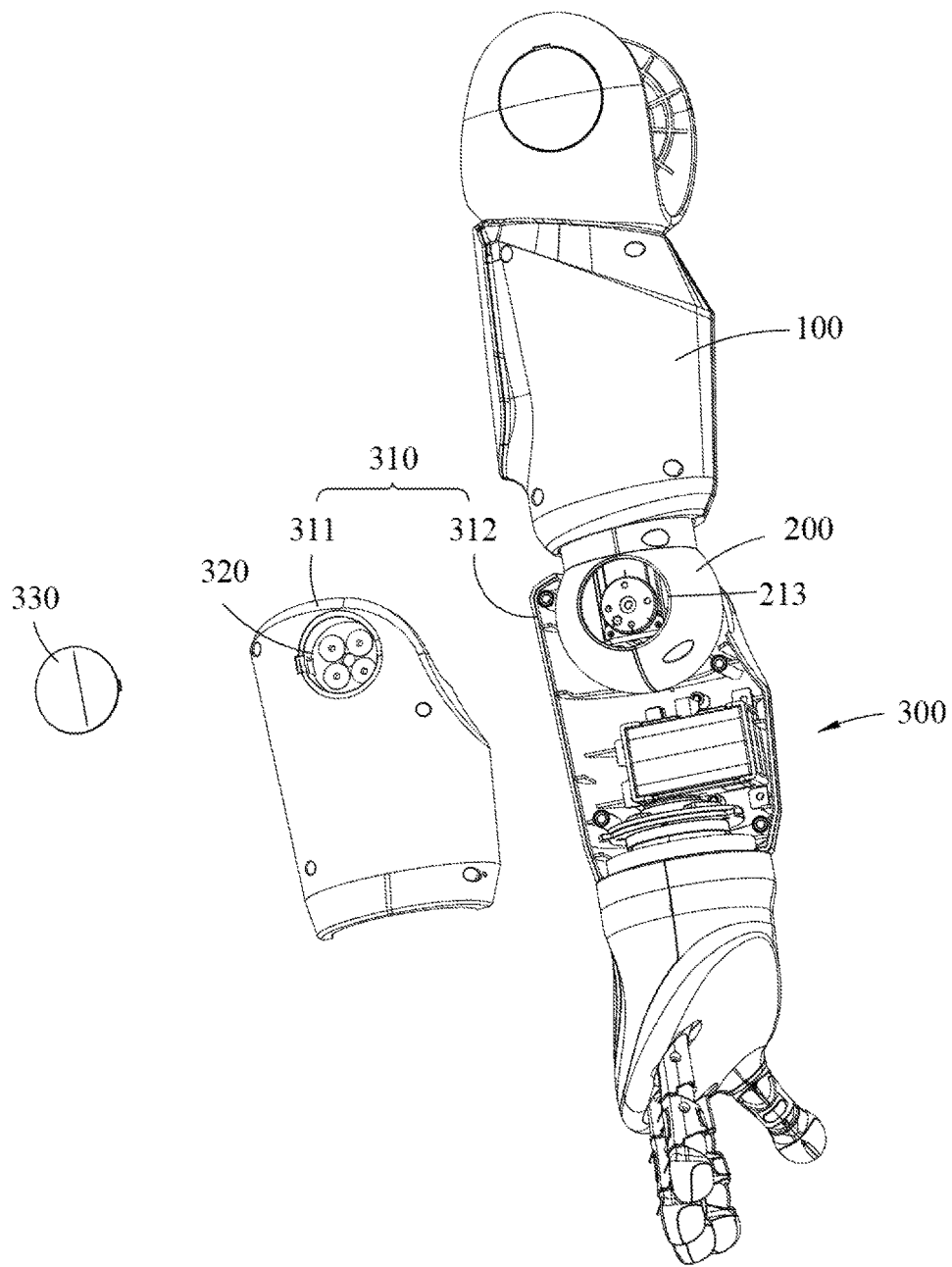
FIG. 7 is an isometric partially exploded view of the joint structure of FIG. 5.

Referring to FIGS. 5-7, compared with the EMBODIMENT 1, the joint structure of the present embodiment further includes a movable member 300 connected to the rotatable member 200. The rotatable member 200 includes a casing 210 and a second servo 220 arranged within the casing 210. The output shaft 2201 of the second servo 220 is perpendicular to the output shaft 1201 of the first servo 120. The movable member 300 includes a shell 310 and a connection portion 320 connected to the shell 310 and the output shaft 2201 of the second servo 220. With the arrangement of the fixed member 100, the rotatable member 200 and the movable member 300, the joint structure has two degrees of freedom, thereby increasing the flexibility of the joint structure.

In one embodiment, referring to FIG. 6, the casing 210 includes a first casing 211 and a second casing 212 detachably connected to the first casing 211. The first casing 211 and the second casing 212 corporately define a second receiving chamber and a second through hole 21 communicating with the second receiving chamber. The connection portion 320 is received in the second through hole 213 (see FIG. 7). Since the first casing 211 and the second casing 212 are detachably connected to each other, it facilitates the detaching of the second servo 220 after the first casing 211 and the second casing 212 are detached from each other.

Referring to FIG. 7, the connection portion 320 is plate-shaped. The rotatable member 200 includes a second servo disc that is used to connect the connection portion 320 to the output shaft of the second servo 220. Since the second servo disc and the connection portion 320 are both plate-shaped, it facilitates the alignment of the second servo disc to the connection portion 320. In the embodiment, the connection portion 320 and the second servo disc are connected to each other via screws. The movable member 300 further includes a decoration member 330 arranged on the outside of the connection portion 320 and used for shielding the connection portion 320 to achieve a good appearance for the movable member 300.

Referring to FIGS. 6 and 7, the shell 310 includes a first shell 311 and a second shell 312 detachably connected to the first shell 311, and the connection portion 320 is arranged at the first shell 311. In the embodiment, the connection portion 320 and the first shell 311 are integrally formed.

Embodiment 3

The present disclosure further provides a robot includes a joint structure of any one of the above embodiments, which will not be repeated here.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A joint structure comprising:
a fixed member, a rotatable member, and a connection assembly; wherein the fixed member comprises a housing and a first servo disposed within the housing, the connection assembly is configured to connect the rotatable member to an output shaft of the first servo, the connection assembly comprises a first flange fixedly connected to the rotatable member and a second flange connected to the output shaft of the first servo and the first flange, and the rotatable member extending from within the housing to an outside of the housing;
wherein the first flange and the second flange are independent from each other and independent from the rotatable member and the first servo; the first flange and the second flange are flat plate structures and axially abut against and align with each other such that the first servo is alignable with rotation of the rotatable member.

2. The joint structure of claim 1, wherein the first servo comprises a first servo disc-connected to the output shaft, and the second flange is detachably attached to the first servo disc.

3. The joint structure of claim 1, wherein the housing comprises a first housing and a second housing detachably connected to the first housing, the first housing and the second housing corporately define a first receiving chamber and a first through hole communicating with the first receiving chamber, the rotatable member passes through the first through hole, and the first servo is received within the first receiving chamber.

4. The joint structure of claim 3, wherein the first housing comprises a first limiting portion at an inner side thereof, the second housing comprises a second limiting portion at an inner side thereof, and the first limiting portion and the second limiting portion corporately surround the first servo.

5. The joint structure of claim 1, wherein the fixed member comprises a bearing, the rotatable member passes through and is in tight interference fit with an inner ring of the bearing, and an outer ring of the bearing is in tight interference fit with an inner side of the housing.

6. The joint structure of claim 1 further comprising a movable member connected to the rotatable member, wherein the rotatable member comprises a casing and a second servo arranged within the casing, an output shaft of the second servo is perpendicular to the output shaft of the first servo, the movable member comprises a shell and a connection portion connected to the shell and the output shaft of the second servo.

7. The joint structure of claim 6, wherein the casing comprising a first casing and a second casing detachably connected to the first casing, the first casing and the second casing corporately define a second receiving chamber and a second through hole communicating with the second receiving chamber, and the connection portion is received in the second through hole.

8. The joint structure of claim 7, wherein the connection portion is plate-shaped, and the rotatable member comprises a second servo disc configured to connect the connection portion to the output shaft of the second servo.

9. The joint structure of claim 6, wherein the shell comprises a first shell and a second shell detachably connected to the first shell, and the connection portion is arranged at the first shell.

10. A robot comprising a joint structure, the joint structure comprising:
a fixed member, a rotatable member, and a connection assembly; wherein the fixed member comprises a housing and a first servo disposed within the housing, the connection assembly is configured to connect the rotatable member to an output shaft of the first servo, the connection assembly comprises a first flange fixedly connected to the rotatable member and a second flange connected to the output shaft of the first servo and the first flange, and the rotatable member extending from within the housing to an outside of the housing;
wherein the first flange and the second flange are independent from each other and independent from the rotatable member and the first servo; the first flange and the second flange are flat plate structures and axially abut against and align with each other such that the first servo is alignable with rotation of the rotatable member.

* * * * *